United States Patent
Bouchier et al.

(10) Patent No.: US 8,028,174 B2
(45) Date of Patent: Sep. 27, 2011

(54) CONTROLLING UPDATE OF CONTENT OF A PROGRAMMABLE READ-ONLY MEMORY

(75) Inventors: Paul H. Bouchier, Little Elm, TX (US); John R. Diamant, Fort Collins, CO (US); Gerald J. Kaufman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1911 days.

(21) Appl. No.: 11/121,892

(22) Filed: May 4, 2005

(65) Prior Publication Data

US 2005/0210231 A1   Sep. 22, 2005

(51) Int. Cl.
 *G06F 12/14* (2006.01)
(52) U.S. Cl. ...................................... 713/194
(58) Field of Classification Search .................. 713/192, 713/194
See application file for complete search history.

(56) References Cited

U.S. PATENT DOCUMENTS

| | | | |
|---|---|---|---|
| 5,022,077 A | 6/1991 | Bealkowski et al. | |
| 5,421,006 A | 5/1995 | Jablon et al. | |
| 5,912,849 A | 6/1999 | Yasu et al. | |
| 6,122,732 A * | 9/2000 | Ahuja | 713/1 |
| 6,154,819 A | 11/2000 | Larsen et al. | |
| 6,510,501 B1 * | 1/2003 | Ho | 711/163 |
| 6,581,159 B1 * | 6/2003 | Nevis et al. | 713/2 |
| 6,615,366 B1 * | 9/2003 | Grochowski et al. | 714/10 |
| 2003/0056070 A1 * | 3/2003 | Dayan et al. | 711/163 |
| 2004/0004858 A1 | 1/2004 | Kondo | |
| 2004/0010702 A1 * | 1/2004 | Lewis | 713/194 |
| 2004/0153672 A1 * | 8/2004 | Watt et al. | 713/201 |

OTHER PUBLICATIONS

Paul Bouchier, "Summary: CR-17—MP must be able to disable FW update from system processors," pp. 1-2 (2003).
Trusted Computing Group, "Trusted Platform Modules Strengthen User and Platform Authenticity," pp. 1-8 (Jan. 2005).

* cited by examiner

*Primary Examiner* — Nasser Moazzami
*Assistant Examiner* — Michael S McNally

(57) ABSTRACT

To control update of content in a programmable read-only memory in a system, the security status associated with the system is determined, where the security status is one of a secure mode and non-secure mode. In response to detecting that the system is in secure mode, a write to the programmable read-only memory is enabled. In response to detecting that the system is in non-secure mode, a write to the programmable read-only memory is disabled.

14 Claims, 3 Drawing Sheets

US 8,028,174 B2

CONTROLLING UPDATE OF CONTENT OF A PROGRAMMABLE READ-ONLY MEMORY

BACKGROUND

A computer or other type of electronic system typically includes firmware instructions that are executed upon initial booting or initialization of the computer or electronic system. In a computer, the firmware instructions include basic input/output system (BIOS) code. Typical tasks performed by the BIOS code include a power-on self test (POST) procedure to perform diagnostic tests of system components to ensure proper functionality, configuration of certain components in the computer, loading of an operating system, and other tasks.

Typically, firmware instructions are stored in a read-only memory (ROM), such as electrically erasable and programmable read-only memory (EEPROM) or a flash memory (which is a type of EEPROM that allows block writes). Storing the firmware instructions in ROM (especially non-erasable ROM or erasable ROM with strong erase/rewrite protection mechanisms) reduces the likelihood that the firmware instructions in the ROM will be inadvertently or maliciously modified and corrupted.

After a computer has been shipped to an end user, it may sometimes be desirable to perform an update of the firmware instructions in the ROM. Update of the firmware instructions may be performed to correct previously unrecognized faults, improve functionality, or for other reasons. To update firmware instructions in the ROM of a computer, an end user typically loads a software program downloaded from a computer network or from a removable medium, such as a compact disk (CD), floppy disk, or other media, into the computer. Such software program is executed in the computer to enable the processor of the computer to write to the ROM for updating the firmware instructions. Upon restart, the computer would fetch the updated firmware instructions from the ROM for execution in the computer to initialize the computer.

An issue associated with the ability to update firmware instructions in ROM is that a malicious software program, such as a computer virus, can infect the computer and cause unauthorized modification of the content of the ROM. Such unauthorized modification of the ROM can cause the computer to be unable to reboot, or may cause the computer to become insecure in a way that allows theft of data, data tampering, or other unauthorized use of the computer, without knowledge of the user.

DETAILED DESCRIPTION

Figure 1:
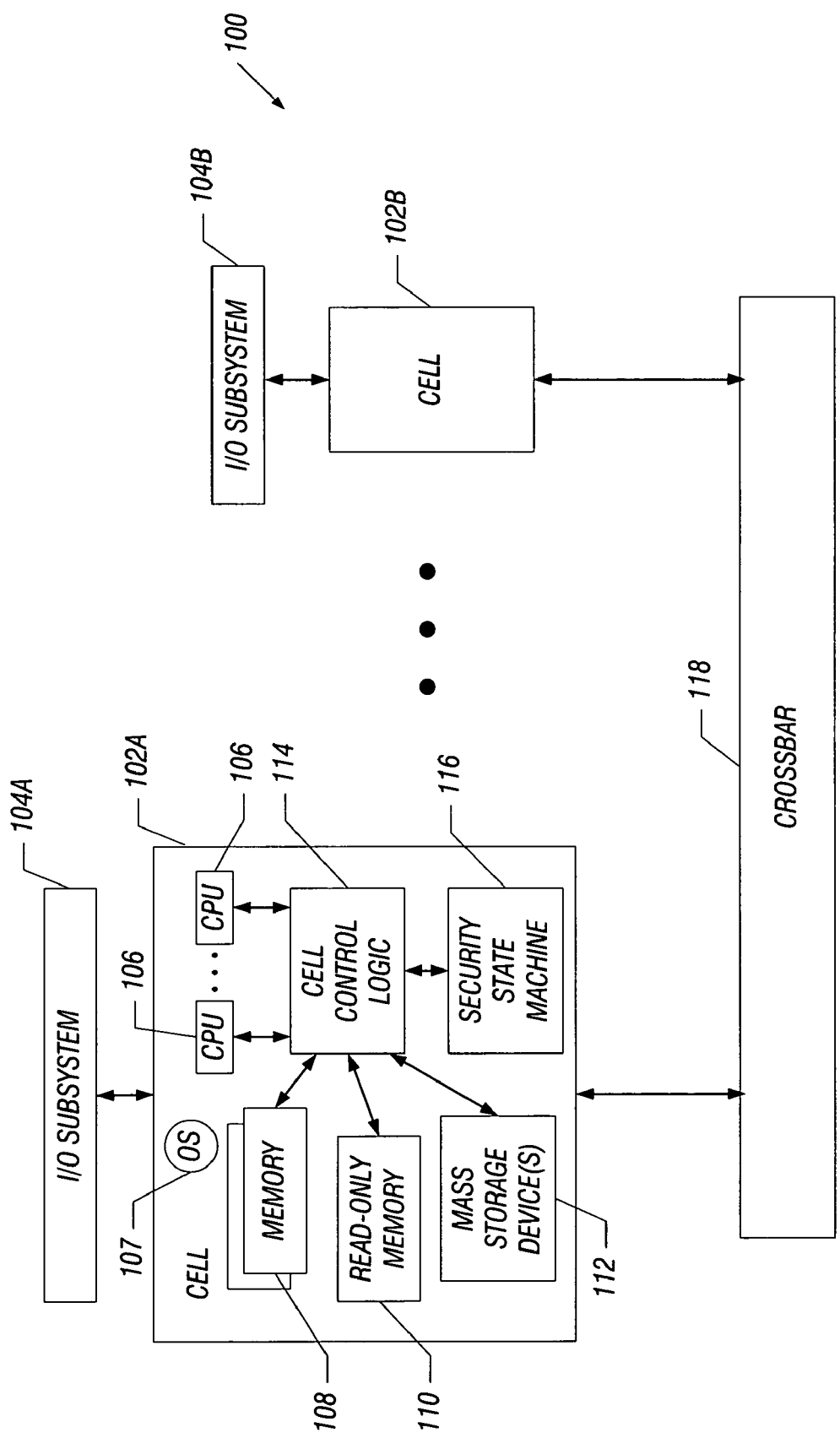
FIG. 1 is a block diagram of an exemplary system that incorporates an embodiment of the invention.

FIG. 1 illustrates an exemplary system 100 (which can be a computer or other type of electronic system) that includes multiple cells 102A, 102B. Each cell 102 is a type of processing module that includes one or more central processing units (CPUs) 106. In the example shown, the system 100 is a multiprocessing system having multiple cells 102A, 102B, with each cell having multiple CPUs 106. In different implementations, the system 100 can alternatively include just one processing module that contains one CPU, such as a processing module included in a desktop computer, mobile computer, personal digital assistant (PDA), and so forth. Embodiments of the invention can be implemented in a non-cellular system different from the example depicted in FIG. 1.

As shown in FIG. 1, the cell 102A further includes a cell control logic 114 that is coupled to the CPUs 106. The cell 102A also includes memory devices 108, a programmable read-only memory (ROM) 110, and one or more mass storage devices 112 (such as hard disk drives, floppy disk drives, compact disk (CD) drives, digital video disk (DVD) drives, and so forth). The memory devices 108 make up the main memory or system memory of the system 100. In some implementations, the memory devices 108 are volatile (or non-persistent) memory devices that lose their content when power is removed from the memory devices 108. The mass storage device(s) are generally persistent storage device(s) (usually with much larger storage capacity than the memory devices 108) that maintain the stored data even though the system power is removed.

The memory devices 108 and mass storage device(s) 112 contain data (such as user data, application data, temporary files, and so forth) that are frequently changed during system operation. The memory devices 108 are designed to hold a subset of the information (instructions and data) stored on the mass storage device(s) 112. As a result, the instructions and data in the memory devices 108 are often swapped with other instructions and data in response to different software modules being active.

The cell control logic 114 in the cell 102A includes a memory controller to control access of the memory devices 108, a ROM control device for controlling access to the programmable ROM 110, and interface logic for controlling access to the one or more mass storage devices 112.

As used here, the term "programmable read-only memory" or "programmable ROM" refers to read-only memory containing data that can be changed by a write operation to the programmable ROM; however, the programmable ROM contains data that is changed much less frequently than data in other types of storage devices, such as the memory devices 108 and one or more mass storage devices 112.

Examples of the programmable ROM 110 include electrically erasable and programmable ROM (EEPROM) and flash memory. A characteristic of the programmable ROM 110 is that data stored on the programmable ROM 110 is not lost upon loss of power to the programmable ROM 110. An EEPROM and flash memory can be modified electrically to enable writes to the programmable ROM 110 by a CPU 106 (or other device) in the system.

The programmable ROM 110 differs from the memory devices 108 and mass storage device(s) 112 in that the programmable ROM 110 is not as easily erasable or writeable as the memory devices 108 and mass storage device(s) 112. According to some embodiments of the invention, the programmable ROM 110 is implemented in a device or device(s) separate from the memory devices 108 and mass storage device(s) 112. The programmable ROM 110 differs in type from the memory devices 108 (which can be implemented with dynamic random access memories or static random access memories, for example), and the mass storage device(s) 112 (floppy disk drives, hard disk drives, CD drives, DVD drives, etc.).

The data contained in the programmable ROM 110 includes firmware instructions associated with the cell 102A, system 100, or some partition of the system 100. For example, a "partition" can include two or more cells, with plural partitions in the system 100 including different sets of cells. The term "firmware instructions" refers to software instructions that are stored in a ROM. The firmware instructions are maintained in the programmable ROM 110 even if power is removed from the cell 102A. This is contrasted to software instructions that are stored in the memory devices 108. Removal of power from the memory devices 108 causes loss of such software instructions stored in the memory devices 108. The firmware instructions, and associated information, are used for initializing the cell 102A and other components in the system 100 during system startup, which occurs during a system power-on sequence or as a result of system reset (e.g., rebooting).

In accordance with embodiments of the invention, a mechanism is provided in the system to protect content of the programmable ROM 110, including the firmware instructions as well as other data. Protecting the content of the programmable ROM 110 prevents malicious software, such as computer software, from modifying the content of the programmable ROM 110 such that the system 100 cannot be booted or the security of the system 100 becomes compromised. The mechanism to protect the content of the programmable ROM 110 prevents writes to the programmable ROM 110 unless the system is in a secure mode.

The firmware instructions in the programmable ROM 110 include basic input/output system (BIOS) code that is loaded for execution in the cell 102A (or system in a non-cellular environment) at system startup. The BIOS code performs tasks such as power-on self test (POST) (to perform diagnostics of components of the cell 102A and other components), configuration of certain components of the cell 102A and other components, and loading of an operating system that is executable in the cell 102A. Instead of being specific to a cell 102, the firmware instructions stored in the programmable ROM 110 can be loaded for initializing a partition of the system 100 or the entire system 100. At system startup, the firmware instructions in the programmable ROM 110 are copied to a location in the memory devices 108 and executed by the CPUs 106.

In accordance with some embodiments of the invention, the cell 102A also includes a security state machine 116 for determining a security status of the cell 102A (or the security status of a partition or of the entire system). The security status includes a secure mode or a non-secure mode (discussed further below). Security status information relating to the security status of the cell 102A is stored in a protected storage location on the cell 102A, such as in a register in the security state machine 116 or cell control logic 114. Alternatively, if suitable tamper-protection mechanisms were in place, the security status information can be stored in a location of the mass storage device(s) 112, in a location of the memory devices 108, or in a location of the programmable ROM 110. This security status information is used by the cell control logic 114 to disable or enable writes to the programmable ROM 110.

If the cell 102A is in secure mode, then writes to the programmable ROM 110 to update the content of the programmable ROM 110 are allowed. However, if the cell 102A is in non-secure mode, then writes to the programmable ROM 110 are disabled by the cell control logic 114.

The cell 102B contains the same elements as the cell 102A. Each cell 102A, 102B is connected to a respective input/output (I/O) subsystem 104A, 104B, which includes I/O circuitry for communicating with other parts of the system 100. Also, the cells 102A, 102B can communicate with each other over a crossbar 118, which is an interconnect structure that enables communication between cells. Although two cells 102A, 102B are depicted in FIG. 1, it is contemplated that other implementations can include three or more cells. As noted above, in other implementations, the system 100 can be a single-cell (single-CPU) system.

Although shown as being part of the cell 102A, it is noted that in other embodiments, the security state machine 116 can reside elsewhere in the system 100. The security state machine 116 can be implemented as a separate integrated circuit (IC) device, such as a field-programmable gate array device, application specific integrated circuit (ASIC) device, and so forth. Alternatively, the security state machine 116 can be implemented as a combination of a CPU 106, a portion of the cell control logic 114, a register, and computer-readable instructions executed by the CPU 106.

Alternatively, instead of using a security state machine, security software 117 (depicted in FIG. 4) executable in a part of the CPU(s) 106, or in another processor or controller, that cannot be tampered with by other software can be used to set the security status information to indicate whether the system is in secure mode or non-secure mode. As an example, the security software can run on a trusted platform module (TPM). More generally, the security software 117 is executable on any tamper-protected device, such as an integrated circuit device, in the system.

In the ensuing discussion, the term "security module" refers to either the security state machine 116 or the security software 117.

Figure 2:
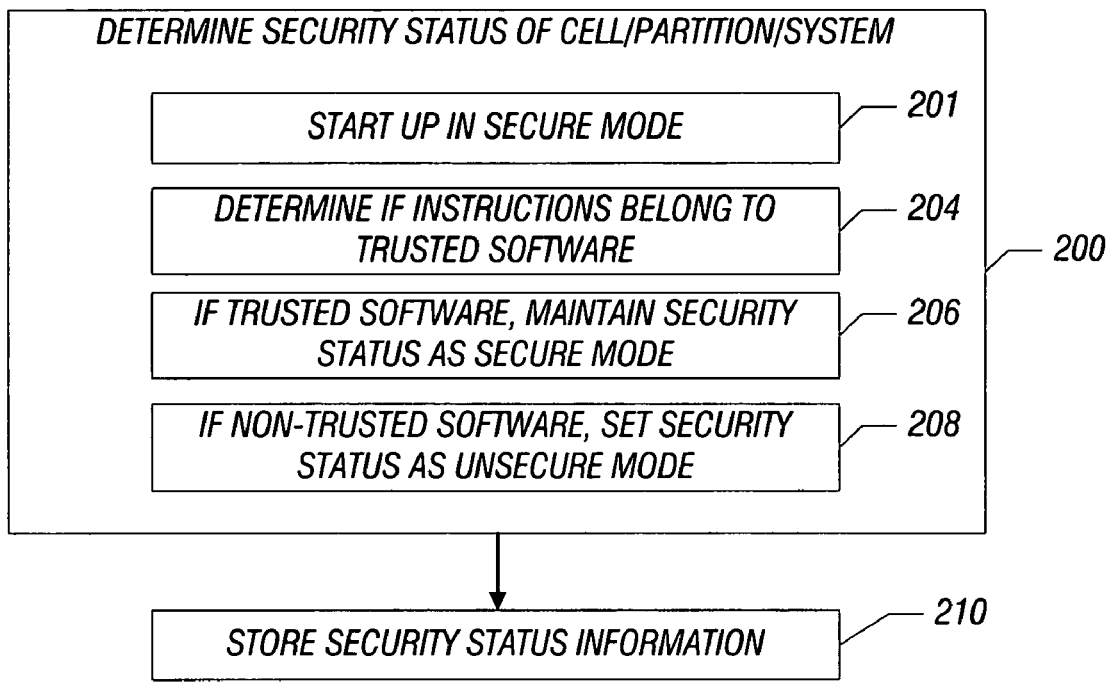
FIG. 2 is a flow diagram of a process performed by a security module to determine a security status associated with the system, in accordance with an embodiment.

FIG. 2 illustrates a process performed by the security module. The security module determines (at 200) a security status associated with the system 100. The "security status associated with the system 100" refers to any of the security status of a cell 102, of a partition in the system 100, or of the entire system 100.

When the cell/partition/system first starts up (e.g., boots up), the cell/partition/system starts up (at 201) in secure mode, since the cell/partition/system is started up by firmware instructions. Firmware instructions are one example of "trusted software."

"Trusted software" refers to software that has been identified and authenticated to perform intended system functions that will not maliciously harm or change the system. An example of trusted software includes the software making up the firmware instructions stored in the programmable ROM 110 (FIG. 1). The firmware instructions are trusted due to the fact that the firmware instructions cannot be changed unless the cell/partition/system is in secure mode. Other types of trusted software include any software that can be authenticated by an authentication protocol that is not subject to corruption by malicious software such as virus programs. Authentication can be performed, for example, by embedding a key or other code in the software, and running a check against that key or code to determine whether the software is from an authorized source, as long as the system is still in secure mode. Once non-trusted code executes, authentication operations may potentially be tampered with. As a result, in some embodiments, the security state cannot go back from secure mode to non-secure mode.

Alternatively, trusted software can be detected by applying a hashing algorithm to the entire software code to derive a hash value. The hash value will indicate whether the software is authorized. For example, un-authorized modification of the software may cause an un-expected hash value to be produced. A tamper-resistant storage in the system can store known good hash values corresponding to specific versions of the software. These stored known good hash values are accessible by the trusted software to validate hash values for determining whether the software has been modified without authorization.

"Non-trusted software" refers to software that cannot be authenticated. Examples of such non-trusted software includes application software, operating system software, and any other type of software that resides in a storage medium that can easily be changed by un-authorized software, such as virus programs, and for which an authentication mechanism is not provided. This also includes any software that can only be authenticated by non-trusted software after the system has transitioned to non-secure mode. The memory devices 108 and mass storage device(s) 112 are examples of storage media that can easily be accessed and changed by un-authorized software. Thus, software applications, operating system modules, and other software modules that reside on such memory devices 108 and mass storage device(s) 112 generally cannot be trusted, unless a trusted authentication mechanism is provided for such software.

The security module monitors (at 202) the software instructions that are being executed in the cell/partition/system. The software instructions can belong to trusted software or non-trusted software. The security module determines (at 204) if the software instructions currently executing in the cell/partition/system belong to trusted software. If the security module determines that the software instructions belong to trusted software, then the security module maintains (at 206) the security status as secure mode. However, if the security module determines that the software instructions belong to non-trusted software, then the security module sets (at 208) the security status as non-secure mode. Once the security status has been changed to non-secure mode, the security status cannot be changed back to secure mode until the cell/partition/system is restarted in a way that precludes non-trusted software from executing. This prevents un-authorized software from modifying the security status.

Next, the security module stores (at 210) the security status information in a storage location in the system 100, such as in a register in the security state machine 116, a register in the cell control logic 114, or a storage location in any of the memory devices 108, programmable ROM 110, and mass storage device(s) 112 (assuming suitable protection mechanisms are implemented). This security status information can later be used by the cell control logic 114 to determine whether writes to the programmable ROM 110 should be allowed for modifying firmware instructions (including the BIOS code) and related information in the programmable ROM 110.

The above describes an embodiment in which the security module (such as the security software) monitors instructions being executed to determine whether trusted software or non-trusted software is executing. In an alternative embodiment, the security module implemented as the security state machine 116 can simply maintain the cell/partition/system in secure mode (from startup time) until the security state machine 116 is notified, such as by the firmware instructions, that other code (which includes non-trusted software) is being loaded for execution. In response to the notification that other code is being loaded for execution, the security state machine 116 changes the security status to non-secure mode. Again, the security state machine 116 will not be able to switch back to secure mode until the cell/partition/system is re-started in a way that precludes non-trusted software from executing.

Figure 3:
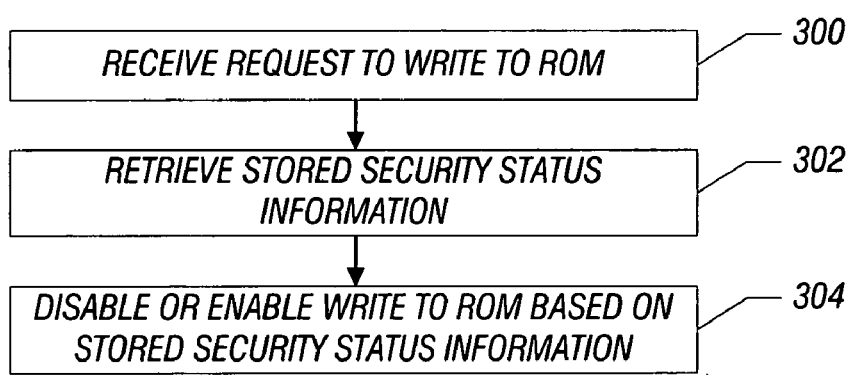
FIG. 3 is a flow diagram of a process performed by logic to disable or enable a write of the content of read-only memory (ROM) in the system of FIG. 1 based on the security status associated with the system, in accordance with an embodiment.

FIG. 3 is a flow diagram of a process performed by the cell control logic 114. The cell control logic 114 receives (at 300) a request to write to the programmable ROM 110 (such as a request to update firmware instructions in the programmable ROM 110). This request can come from one of the CPUs 106 under control of software running in the cell 102A, or through the crossbar 118 from another cell or from some other component in the system 100. The request can also be originated from a device outside the system 100, such as a network device coupled to a network. In response to the request to write to the programmable ROM 110, the cell control logic 114 retrieves (at 302) the stored security status information. Next, the cell control logic 114 disables or enables (at 304) the requested write to the programmable ROM 110 based on the stored security status information. If the cell/partition/system is in secure mode, then the cell control logic 114 permits the requested write to the ROM. On the other hand, if the cell/partition/system is in non-secure mode, then the cell control logic 114 disables writes to the programmable ROM 110.

Figure 4:
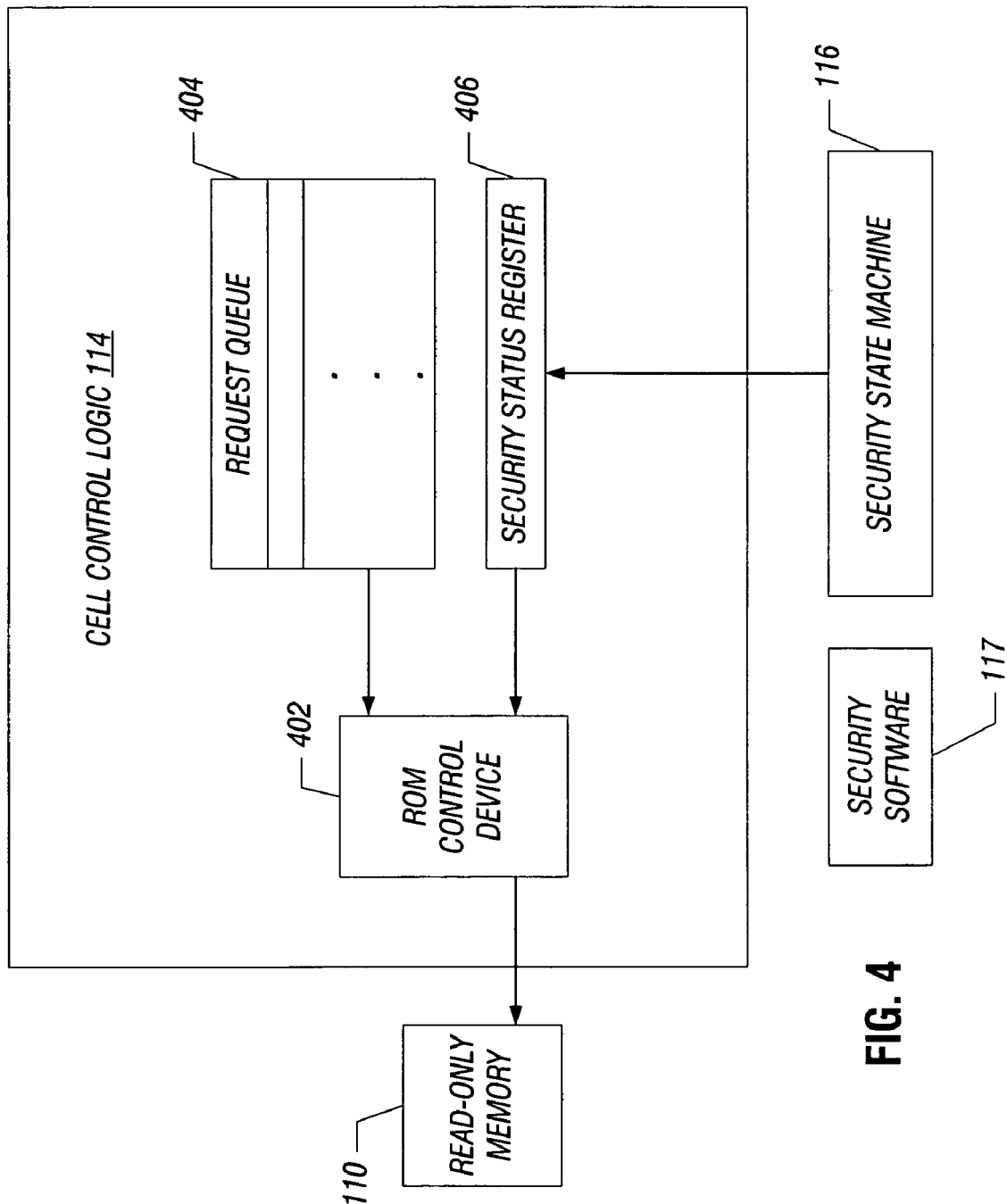
FIG. 4 is a block diagram of logic for controlling writes to the ROM, according to an embodiment.

FIG. 4 illustrates portions of the cell control logic 114 as they relate to the security state machine 116 or security software 117 and programmable ROM 110. The cell control logic 114 includes a ROM control device 402 for controlling access (read access and write access) of the programmable ROM 110. The cell control logic 114 includes a request queue 404 that stores one or more requests (read requests or write requests) for data in the programmable ROM 110. The cell control logic 114 also includes a security status register 406 for storing security status information that has been retrieved or received by the cell control logic 114. The security status information stored in the security status register 406 is provided by the security state machine 116 or security software 117. If the pending request in the request queue 404 is a write request, the ROM control device 402 accesses the security status register 406 to determine the security status of the cell/partition/system. The enabling or disabling of a write to the programmable ROM 110 is based on the determined security status from the security status register 406.

A control signal provided from the ROM control device 402 to the programmable ROM 110 is a write enable signal (which when activated enables a write to the programmable ROM 110). If the ROM control device 402 detects that the cell/partition/system is in non-secure mode, then the write enable signal will be gated (or otherwise driven) to an inactive state to prevent a write to the programmable ROM 110.

However, if the cell/partition/system is detected to be in a secure mode, then the ROM control device 402 will enable activation of the write enable signal to allow writes to the programmable ROM 110 in response to write requests in the queue 404.

Thus, according to some embodiments of the invention, a security mechanism is provided for updating the content of the programmable ROM 110. The updated content of the ROM 110 includes firmware instructions (including BIOS code) and associated information. In this manner, a user can install new firmware instructions into the system with confidence that compromised, corrupted, or malicious firmware instructions would not be loaded into the programmable ROM 110. Thus, for example, the security mechanism prevents a virus program or other un-authorized software from modifying the content of the ROM 110.

As noted above, in one embodiment, the security module can be implemented as software instructions running on a CPU 106. Such instructions can be loaded for execution on a corresponding processor, such as a CPU 106. The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

The software instructions are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of controlling update of content in a programmable read-only memory in a system, comprising:
    determining a security status associated with the system, the security status being one of a secure mode and a non-secure mode, wherein determining the security status associated with the system comprises determining the security status by a security module that monitors a type of software executing in the system, wherein the security module sets the security status to the secure mode in response to the security module detecting that the type of software includes firmware instructions executing in the system, wherein the security module changes the security status to the non-secure mode in response to the security module detecting that the type of software includes operating system instructions executing in the system;
    in response to detecting that the system is in the secure mode, enabling a write to the programmable read-only memory; and
    in response to detecting that the security status is in the non-secure mode, disabling a write to the programmable read-only memory.

2. The method of claim 1, wherein the security module executes on a tamper-protected portion of a device in the system.

3. The method of claim 1, further comprising:
    in response to detecting that a write to the programmable read-only memory is enabled, updating firmware instructions in the programmable read-only memory.

4. The method of claim 3, wherein updating the firmware instructions in the programmable read-only memory comprises updating basic input/output system (BIOS) instructions.

5. The method of claim 3, further comprising:
    in response to detecting that a write to the programmable read-only memory is disabled, preventing an update of the firmware instructions in the programmable read-only memory.

6. The method of claim 1, wherein controlling update of the content in the programmable read-only memory comprises controlling update of the content in one of an electrically erasable and programmable read-only memory and a flash memory.

7. The method of claim 1, wherein controlling update of the content in the programmable read-only memory comprises controlling update of the content in the programmable read-only memory that is separate from mass storage and volatile memory in the system.

8. A system comprising:
    a programmable read-only memory;
    a security module comprising a central processing unit to detect a security status associated with the system and to provide security status information based on the detected security status, wherein detection of the security status is based on a type of software executing in the system, wherein the security module is configured to set the security status to a secure mode in response to the security module detecting that the type of software includes firmware instructions executing in the system, wherein the security module is configured to change the security status to a non-secure mode in response to the security module detecting that the type of software includes operating system instructions executing in the system; and
    a control device to enable a write to the programmable read-only memory in response to the security status information indicating the secure mode, and
    the control device to disable a write to the programmable read-only memory in response to the security status information indicating the non-secure mode.

9. The system of claim 8, the programmable read-only memory to store firmware instructions, wherein the control device is configured to, in response to a request to update the firmware instructions:
    write to the programmable read-only memory to update the firmware instructions in response to detecting that the security status information indicates the secure mode; and
    block a write to the programmable read-only memory in response to detecting that the security status information indicates the non-secure mode.

10. The system of claim 8, further comprising plural processing modules, the programmable read-only memory being part of one of the processing modules,
    wherein the security status associated with the system comprises a security status of the one processing module.

11. The system of claim 8, further comprising one or more mass storage devices and volatile memory devices, wherein the programmable read-only memory is separate from the one or more mass storage devices and volatile memory devices.

12. The system of claim 8, further comprising one or more mass storage devices and volatile memory devices, wherein the programmable read-only memory is a different type of storage than the one or more mass storage devices and volatile memory devices.

13. An article comprising at least one non-transitory machine-readable storage medium containing instructions that when executed cause a system to:
    determine a security status associated with the system, the security status being one of a secure mode and a non-secure mode, wherein determining the security status associated with the system comprises determining the security status by a security module that monitors a type of software executing in the system, wherein the security module sets the security status to the secure mode in response to the security module detecting that the type of software includes firmware instructions executing in the system, wherein the security module changes the security status to the non-secure mode in response to the security module detecting that the type of software includes operating system instructions executing in the system;

in response to determining that the security status is the secure mode, set security status information to indicate the secure mode for enabling an update of firmware instructions in a programmable read-only memory; and in response to determining that the security status is the non-secure mode, set the security status information to indicate the non-secure mode for disabling the update of firmware instructions in the programmable read-only memory.

14. A system comprising:

a programmable read-only memory;

processor means for determining a security status associated with the system, the security status being one of a secure mode and a non-secure mode, wherein determining the security status associated with the system comprises determining the security status by a security module that monitors a type of software executing in the system, wherein the security module sets the security status to the secure mode in response to the security module detecting that the type of software includes firmware instructions executing in the system, wherein the security module changes the security status to the non-secure mode in response to the security module detecting that the type of software includes operating system instructions executing in the system;

means responsive to detecting that the system is in the secure mode for enabling an update of firmware instructions in the programmable read-only memory; and means responsive to detecting that the security status is in the non-secure mode for disabling the update of the firmware instructions in the programmable read-only memory.

\* \* \* \* \*